Nov. 25, 1969   J. HALL   3,479,907

TORSIONAL VIBRATION DAMPER

Filed Dec. 5, 1967

INVENTOR:
JEFFREY HALL

BY
Attorney

United States Patent Office 3,479,907
Patented Nov. 25, 1969

3,479,907
TORSIONAL VIBRATION DAMPER
Jeffrey Hall, Sheepridge, England, assignor to Holset Engineering Company Limited
Filed Dec. 5, 1967, Ser. No. 688,033
Claims priority, application England, Nov. 3, 1967, 50,065/67
Int. Cl. F16f 15/12
U.S. Cl. 74—574                                 7 Claims

ABSTRACT OF THE DISCLOSURE

The present invention relates to a torsional vibration damper in which the hub member is of at least two part construction such that at least one elastic element may be placed in position prior to assembly of the hub member and an inertia member.

---

Figures 1, 2:
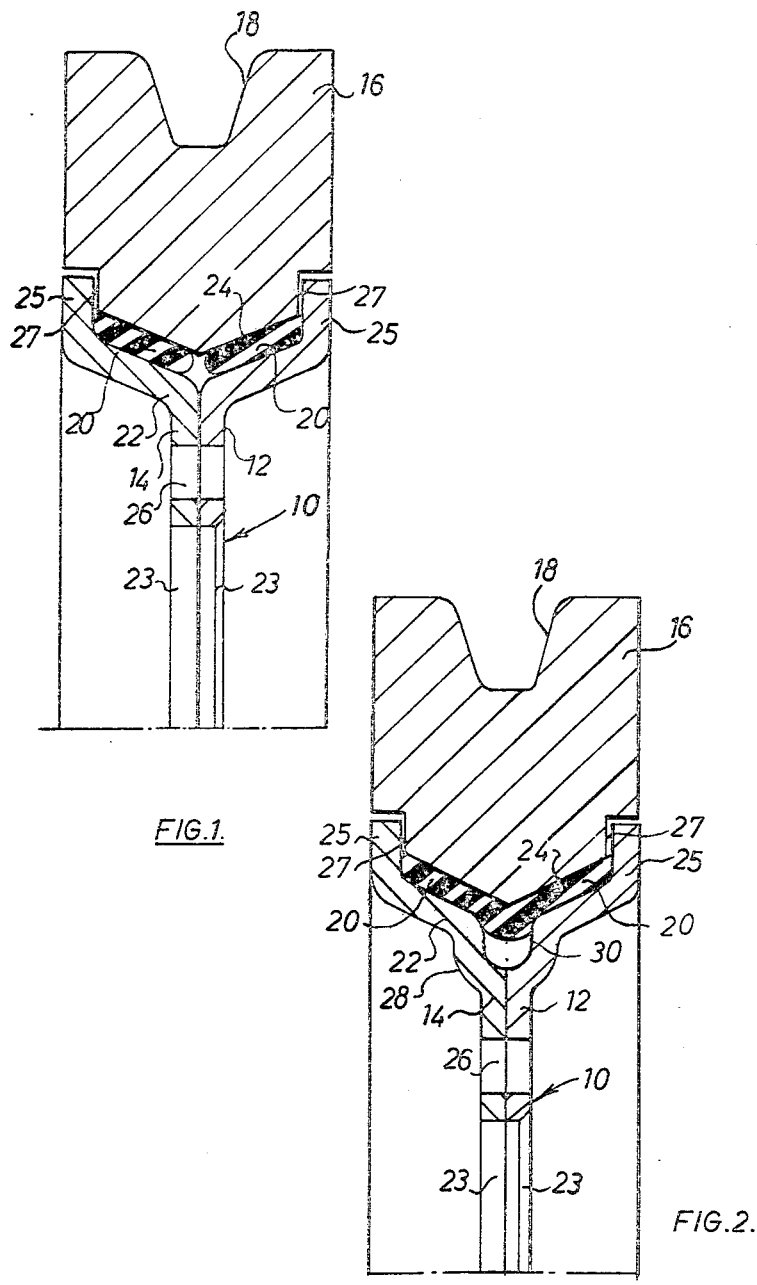

The present invention relates to torsional vibration dampers of the type arranged, for example to be mounted on the end of the crank-shaft of a reciprocating engine such as an internal combustion engine.

According to the present invention a torsional vibration damper comprises a rigid hub member, an inertia member mounted concentrically of said hub member and at least one elastic element interposed between said hub member and said inertia member, said hub member being of at least two part construction such that said elastic element or elements may be placed in position prior to assembling the hub member and inertia member.

The hub member preferably comprises two identical pressings placed back to back.

In one preferred form of the invention two elastic elements are used, one of which is disposed between one of the parts of the hub member and the inertia member and the other of which is disposed between the other part of the hub member and the inertia member.

In a second preferred form of the invention a single elastic element is utilized and the two parts of the hub member are shaped such that said hub member includes a cavity capable of accommodating any deformation of the elastic element which takes place during assembly of the damper.

Preferably the hub member includes a peripheral flange on either side thereof which acts to retain the inertia member, to prevent the elastic element or elements from being displaced from between the hub member and the inertia member, and to protect the ends of the elastic element or elements.

The invention will now be further described by way of example with reference to the accompanying drawings, in which—

FIGURE 1 is a sectional view of a part of a torsional vibration damper according to one form of the invention, and FIGURE 2 is a sectional view of a part of a torsional vibration damper according to a second embodiment of the invention.

Like numbers have been used to describe like parts in both figures.

In FIGURE 1 of the drawings there is shown a torsional vibration damper comprising a circular hub member 10 formed from two identical rigid pressings 12 and 14 placed back-to-back and an inertia member 16 having a pulley groove 18 and mounted concentrically of the hub member 10. Disposed between the hub member 10 and the inertia member 16 are two cylindrical shaped elastic elements 20 made from rubber or a rubber-like material. Each of the two parts 12, 14 of the hub member 10 is of dished shape, the outer wall 22 of the member being disposed at an angle of between 95° and 125°, preferably between 105 and 110°, to the central portion 23. The internal face 24 of the inertia member 16 is similarly angled. A peripheral flange 25 is formed on each part of the hub member and serves to retain the inertia member 16 in position, to stop the elastic elements 20 from being displaced from between the hub member 10 and inertia member 16 and to protect the elastic elements 20.

To assemble the arrangement shown in FIGURE 1 the two elastic elements 18 are placed in position against the inertia member and the two parts 12, 14 of the hub member are pressed together from either side of the inertia member. Alternatively the two elastic elements may be placed in position against the two parts 12, 14 of the hub member, which two parts are then pressed into position relative to the inertia member 16. The elastic elements are initially thicker than shown in the drawings and become compressed during assembly. Finally the two parts of the hub member are rivetted or spot welded together. Holes 26 may be used to attach the damper assembly to the end of a crank-shaft. The clearance 27 between the inertia member 16 and the flange 25 is small to prevent extrusion of the elastic elements 20.

Referring now to FIGURE 2, the arrangement shown is similar to that of FIGURE 1, but a single elastic element 29 is utilized and each of the two parts of the hub member is shaped at 28 so that in the assembled form a cavity 30 is provided to accommodate deformation of the elastic element as the two parts of the hub member are pressed together when assembling the damper.

It will be clear that many modifications may be made to the damper shown in the drawings. For example although a non-bended construction has been shown the invention may also be applied to bended constructions. Also the pulley groove 18 may be omitted from the inertia member 16 if desired.

Among the advantages of the damper of the invention are (i) that assembly may be easier than with existing methods where the elastic element has to be forced between the hub member and the inertia member after assembly of these two parts, and (ii) if desired two identical pressings may be used to form the hub member.

I claim:
1. A torsional vibration damper comprising an at least two part rigid hub member, each part having outer wall portions, an annular inertia member having an outer pulley groove and an inner section substantially V shaped, each of the two arms of the V being substantially parallel to one of said outer wall portions of said two parts of said hub member; said inertia member mounted concentrically of said hub member and at least one elastic element interposed between said hub member and said inertia member, each part of said hub member including a generally flat central portion, each said outer wall portion extending outwardly from the said flat central portion at an angle and a peripheral flange portion extending from the outer edge of said outer wall portion; said at least two part construction of the hub member permitting said at least one elastic element to be placed in position to assembling the hub member and inertia member, said at least one elastic element being radially compressed.

2. A torsional vibration damper according to claim 1, wherein two elastic elements are used, one of said elastic elements being disposed between one of the parts of the hub member and the inertia member and the other of said elastic elements being disposed between the other part of the hub member and the inertia member.

3. A torsional vibration damper according to claim 1, wherein a single elastic element is utilized and the two parts of the hub member are shaped such that said hub member includes a cavity capable of accommodating any deformation of the elastic element which takes place during assembly of the damper.

4. A torsional vibration damper according to claim 1, wherein said hub member comprises two identical pressings placed back to back; each of said two parts of said hub member being dish shaped, the internal face of said inertia member mating with said outer wall of said hub member relative the central portion of said hub member at an angle between 95° and 125° with said at least one elastic element interposed therebetween radially compressed, and peripheral flange means to retain said inertia member in position to prevent displacement of said at least one elastic member and to protect its ends.

5. A torsional vibration damper according to claim 1, wherein each of the two parts of said hub comprises a generally flat central portion and an outer wall portion disposed at an angle to said central portion.

6. A torsional vibration damper according to claim 5, wherein said outer wall is disposed at an angle of between 95° and 125° to said central portion.

7. A torsional vibration damper according to claim 6, wherein said outer wall is disposed at an angle of between 105° and 110° to said central portion.

References Cited

UNITED STATES PATENTS

| | | | |
|---|---|---|---|
| 2,477,081 | 7/1949 | Peirce | 74—574 |
| 2,526,744 | 10/1950 | Hardy | 74—574 |
| 2,556,999 | 6/1951 | Hardy | 74—574 |
| 2,764,038 | 9/1956 | Peirce et al. | 74—574 |
| 2,939,338 | 6/1960 | Troyer | 74—574 |
| 2,972,904 | 2/1961 | Troyer | 74—574 |
| 3,108,490 | 10/1963 | Turlay | 74—574 |

FRED C. MATTERN, Jr., Primary Examiner

F. D. SHOEMAKER, Assistant Examiner